US010581775B2

(12) United States Patent
Aniyan et al.

(10) Patent No.: US 10,581,775 B2
(45) Date of Patent: Mar. 3, 2020

(54) AUTOMATIC USAGE CONTROL OF INSTANT MESSAGES IN COMPUTING SYSTEMS

(71) Applicant: Microsoft Technology Licensing, LLC, Redmond, WA (US)

(72) Inventors: Mathew Kuzhithattil Aniyan, Bothell, WA (US); Nagendra Kalyan Nanduru, Redmond, WA (US); Koushik Dasgupta, Sammamish, WA (US); Yaming Liu, Sammamish, WA (US); Umashree Narayanaswamy, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 16/021,552

(22) Filed: Jun. 28, 2018

(65) Prior Publication Data
US 2020/0007476 A1 Jan. 2, 2020

(51) Int. Cl.
*G06F 15/16* (2006.01)
*H04L 12/58* (2006.01)
*H04L 29/08* (2006.01)

(52) U.S. Cl.
CPC .......... *H04L 51/046* (2013.01); *H04L 51/043* (2013.01); *H04L 67/22* (2013.01)

(58) Field of Classification Search
USPC ........ 709/206, 204, 219, 217, 228, 229, 227
See application file for complete search history.

(56) References Cited

U.S. PATENT DOCUMENTS

| 7,032,007 B2 | 4/2006 | Fellenstein et al. |
| 7,194,536 B2 | 3/2007 | Fellenstein et al. |
| 7,209,957 B2 | 4/2007 | Patron et al. |
| 7,315,891 B2 | 1/2008 | Donahue |

(Continued)

FOREIGN PATENT DOCUMENTS

CN 106059901 A 10/2016

OTHER PUBLICATIONS

Czerwinski, et al., "Instant Messaging and Interruption: Influence of Task Type on Performance", In Proceedings of OZCHI Australasian Computer-Human Interaction Conference, Dec. 4, 2000, 6 Pages.

(Continued)

*Primary Examiner* — Jude Jean Gilles
(74) *Attorney, Agent, or Firm* — Liang IP, PLLC

(57) ABSTRACT

Instant message servers configured for automatic instant message usage control in an instant message system are disclosed herein. In one example, an instant message server can be configured to determine an IM usage time of the user during the one or more IM sessions based on numbers of the detected occurrences of the IM events and weight factors corresponding to each type of the IM events. The weight factors correlate the numbers of occurrences of each type of the IM events to a corresponding IM usage period for each occurrence. The instant message server can then perform a comparison of the determined IM usage time of the user with a preset threshold and when the IM usage time of the user exceeds the threshold based on the comparison, automatically adjust the IM service provided to the user by the instant message server.

20 Claims, 8 Drawing Sheets

(56) References Cited

U.S. PATENT DOCUMENTS

| | | | |
|---|---|---|---|
| 7,818,379 B1* | 10/2010 | Heikes | H04L 51/04 709/206 |
| 7,921,163 B1* | 4/2011 | Odell | H04L 51/04 709/206 |
| 8,015,249 B2 | 9/2011 | Nayak et al. | |
| 8,255,514 B2 | 8/2012 | DeHaas et al. | |
| 8,387,118 B2 | 2/2013 | Zubas et al. | |
| 8,626,117 B2 | 1/2014 | Thakur et al. | |
| 9,177,295 B2 | 11/2015 | Braam et al. | |
| 9,338,399 B1* | 5/2016 | Franco | H04N 7/152 |
| 2002/0111887 A1 | 8/2002 | Mcfarlane et al. | |
| 2006/0167849 A1* | 7/2006 | Marcus | H04L 51/04 |
| 2009/0094343 A1* | 4/2009 | Mehrotra | G06F 15/16 709/207 |
| 2009/0164622 A1 | 6/2009 | Braam et al. | |
| 2009/0187630 A1* | 7/2009 | Narayanaswami | G06Q 10/107 709/206 |
| 2010/0324964 A1 | 12/2010 | Callanan et al. | |
| 2013/0185363 A1* | 7/2013 | DeLuca | H04L 51/04 709/206 |
| 2013/0205229 A1* | 8/2013 | Post | H04L 51/04 715/758 |
| 2015/0025943 A1 | 1/2015 | Schmidt et al. | |
| 2015/0099491 A1* | 4/2015 | Jeon | H04W 4/12 455/412.2 |
| 2016/0191437 A1 | 6/2016 | Thomas et al. | |
| 2017/0105115 A1* | 4/2017 | Quiros | H04M 1/2535 |
| 2017/0116552 A1 | 4/2017 | Deodhar et al. | |
| 2018/0006975 A1 | 1/2018 | Tian et al. | |
| 2018/0150338 A1* | 5/2018 | Markello | G06F 11/3409 |

OTHER PUBLICATIONS

Gandhi, Shruti, "IM Analysis", Retrieved from: http://www.cs.columbia.edu/~hgs/research/projects/IManalysis/IM%2520Analysis%2520Report.html, Retrieved Date: Jun. 13, 2018, 11 Pages.

"International Search Report and Written Opinion Issued in PCT Application No. PCT/US2019/036641", dated Aug. 22, 2019, 14 Pages.

* cited by examiner

AUTOMATIC USAGE CONTROL OF INSTANT MESSAGES IN COMPUTING SYSTEMS

BACKGROUND

Instant messaging (IM) is a type of online chat that offers real-time electronic text transmissions over a computer network, such as the Internet. In an IM chat, short text messages are typically transmitted between two or more users. Some IM applications can use push technology to transmit text messages character by character as a user is typing a text message. Other IM applications can also facilitate desktop presentations, file transfers, clickable hyperlinks, Voice over IP (VoIP) calls, or video chats among users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

IM can enable effective communications among users by allowing almost instantaneous receipt and/or reply of electronic text messages. Users, such as employees of an organization, can communicate and collaborate efficiently with one another via IM to complete assigned tasks. However, excessive use of IM may act as a distractor to negatively impact productivity and/or lifestyle of employees. For example, an employee may spend a large portion of a workday reading and responding to Instant messages instead performing his/her own assigned tasks. Incoming Instant messages can also interrupt attention or focus of an employee while completing a task. In another example, an employee may receive and respond Instant messages for work even after hours. Such indiscriminate use of IM can thus degrade productivity and/or worsen work-life balance of employees. Thus, allowing employees to limit or modify IM usage may be desirable for the benefits of both the employees and the organization.

One challenge of limiting IM usage is that accurately measuring IM usage of users may be difficult. For example, in one scenario, users engage in an IM conversation by sending and responding Instant messages in a rapid succession. In such a scenario (referred to as "active IM session"), IM usage may be measured by time delays between receiving an Instant message and responding to the received Instant message. However, in other scenarios, an initiating user may send multiple Instant messages to a recipient user. The recipient user, however, does not respond or even read the received Instant messages from the initiating user. After an elapsed time, the recipient user may then respond with multiple Instant messages of his/her own, at which time the initiating user may be busy, offline, or otherwise unable to read or respond to any Instant messages. In such complex scenarios, measuring IM usage for the initiating and recipient users may be difficult because a large portion of delays between receptions and responses of Instant messages may not involve IM usage at all. Variations in IM communication patterns can be virtually infinite. Thus, accurately measuring time spent reading and composing Instant messages for determining IM usage can be difficult.

Several embodiments of the disclosed technology are directed to allowing users to control own IM usage by sufficiently accurately measuring IM usage as a function of numbers of IM events during IM sessions. Example IM events can each include sending an Instant message, receiving an Instant message, application sharing via IM, an audio/video conversation start, accept, and stop, receiving a user comment such as like, etc. Without being bound by theory, it has been recognized that measuring numbers or occurrences of the foraging example IM events can be generally accurate by using, for instance, a counter. Based on such accurately measured numbers of IM events, IM usage can be sufficiently accurately derived by converting the numbers or occurrences to periods of time based on a correlation between time spent in IM sessions and corresponding numbers of IM events.

In one implementation, an IM server can include an IM usage engine configured to accurately monitor and determine IM usage of users of an IM service provided by the IM server. The IM usage engine can include a correlator that is configured to access historical data representing response delays to Instant messages in multiple active IM sessions. For example, the delays can each be represented by a time elapsed between receiving an instant message and responding to the received Instant message by a user during an active IM session. The individual response delays can then be summed to represent a total response delay for the active IM session. Without being bound by theory, it is believed that the total response delay can generally accurately represent IM usage during the active IM sessions because such delays can each represent a period a user spend reading an incoming Instant message and composing a response to a received incoming Instant message.

Based on the accessed data of response delays, the correlator can be configured to determine respective weights or weight factors for each type of IM events detected during the active IM sessions such that a combination of the weighted numbers of IM events sufficiently accurately match (e.g., within 95%) total response delay for each user measured during the active IM sessions, as follows:

$$\text{Usage(time)} = w_1 A_1 + w_2 A_2 + w_3 A_3 + \ldots + w_n A_n \quad (1)$$

where Usage is measured in time; $w_1, w_2, w_3, \ldots w_n$, are weights for respective numbers or occurrences of IM events $A_1, A_2, A_3, \ldots, A_n$. Examples of the weights can include integers, floating point numbers, or other suitable types of numbers.

Many techniques can be implemented in the correlator to determine the weights. For example, the correlator can be configured to determine the weights via iteration. In certain implementations, preset initial values of the weights can be used to calculate a usage time, as shown in Equation (1) above. The calculated usage time can then be compared to the sum of the measured response delays. If the difference is greater than a convergence threshold, the weights can be adjusted according to, for example, the difference between the calculated usage time and the sum of the measured response delays. The foregoing iteration operations can then be repeated until convergence, i.e., the difference between the measured usage time and calculated usage time is within a threshold of each other, e.g., within 95%, 99%, or other suitable values. In other examples, the correlator can be configured to derive the weights directly by, for instance, dividing the sum of the measured response delays by the number of detected IM events.

The IM usage engine can also include a monitor that is configured to determine IM usage of users by monitoring numbers of IM events in IM sessions and deriving corresponding IM usage according to Equation (1) above by using the weights provided by the correlator for various IM communication patterns. For instance, in an active IM session in which only text messages are sent and received, the IM usage may be measured as follows:

$$\text{Usage(seconds)}=1.5\times(A_1)+0.5\times(A_2)$$

where $A_1$ is a number of Instant messages sent and $A_2$ is a number of Instant messages received. As shown above, IM usage as measured in seconds can be sufficiently accurately derived based on $A_1$ and $A_2$ with corresponding weights, i.e., 1.5 and 0.5, respectively. Thus, in an example IM session, if $A_1$ equals twenty and $A_2$ equals twenty one, then the IM usage is equal to 1.5×20+0.5×21=40.5 seconds.

The IM usage engine can also include a reporter that is configured to output the derived IM usage to users periodically (e.g., daily, weekly, etc.). In certain implementations, the reporter can also be configured to output statistics or metrics of the derived IM usage during and/or after working hours based on, for example, historical data, IM usage of other users, average IM usage in the organization, etc. For example, the reporter can indicate an anomalous pattern is detected in a user's IM usage during and/or after working hours when a weekly IM usage of the user spiked when compared to historical means. In another example, the reporter can also indicate that a user's IM usage significantly deviates from an average IM usage in the organization and/or a role of the user in the organization. In a further example, the reporter can also indicate that a user's productivity may be negatively impacted when any of the foregoing occurrences are detected.

The IM usage engine can further include a controller that is configured to allow users, administrators, or other suitable entities to limit or adjust various settings of IM service provided by the IM server to the users of the organization. In one implementation, the controller can be configured to provide notifications to users to stop or reduce IM use during and/or after working hours when a corresponding threshold has been exceeded. In another implementation, the controller can also be configured to mute instant message notifications at specific times (e.g., after hours) to reduce IM usage. In further implementations, the controller can also be configured to automatically showing a user's online IM status as "Do Not Disturb," "Busy," "Off Work," or other suitable status irrespective to a current online IM status of the user.

Several embodiments of the disclosed technology can thus allow the IM server to adequately control IM usage within an organization by sufficiently accurately measuring IM usage measured in time as a function of numbers of IM events. Once sufficiently accurate IM usage is obtained, the IM server can be configured to automatically adjust certain functionalities of the provided IM service such that distractions to users during and/or after working hours can be reduced. As such, the IM server can provide IM services to users to facilitate efficient communications and collaboration among the users while help to reduce distractions and worsen work-life balance of the users.

DETAILED DESCRIPTION

Figure 1:
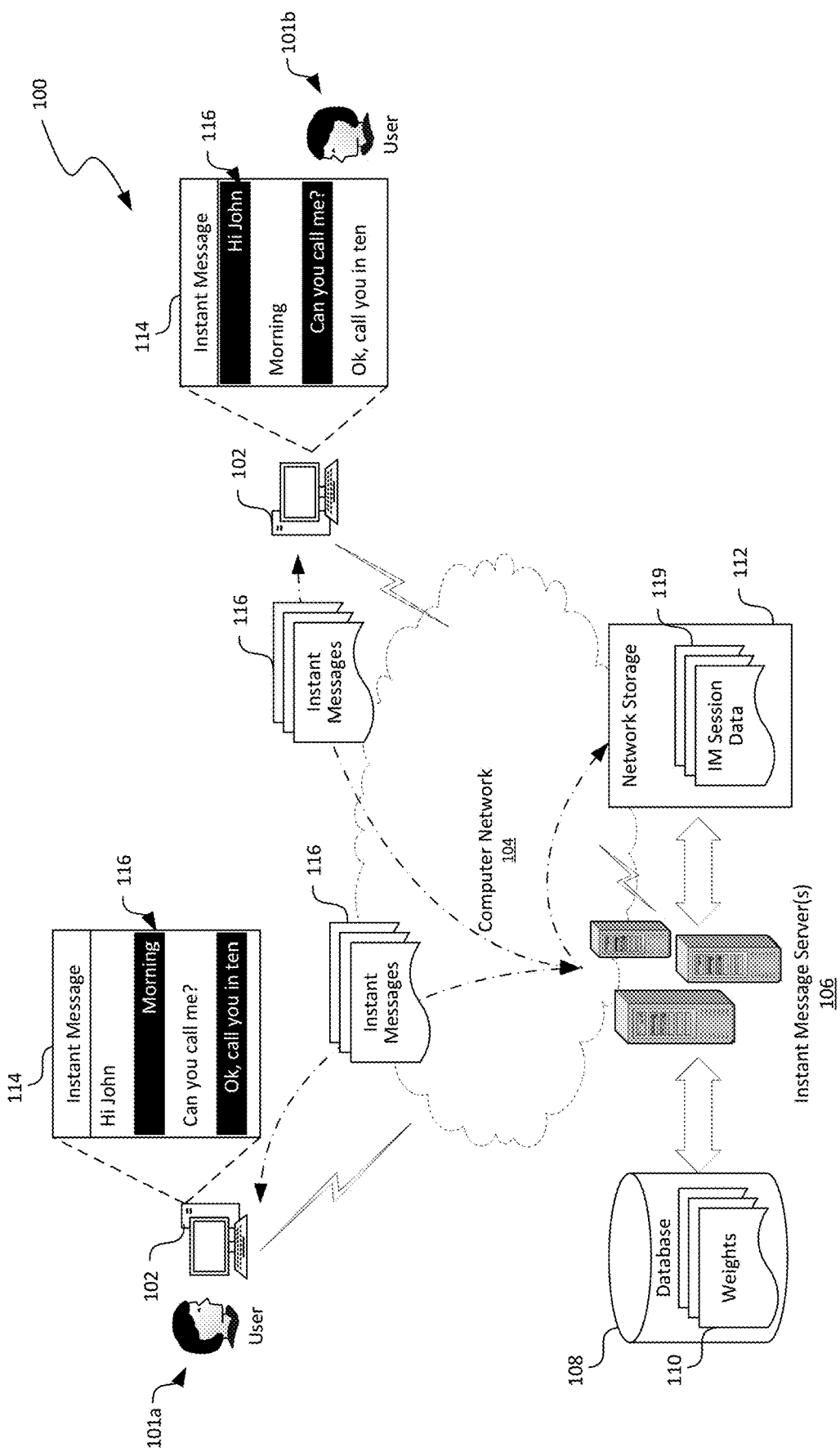
FIG. 1 is a schematic diagram illustrating an instant message system implementing automatic IM usage control in accordance with embodiments of the disclosed technology.

Certain embodiments of systems, devices, components, modules, routines, data structures, and processes for automatic IM usage control are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term "instant message server" or "IM server" generally refers to one or more computers dedicated to running IM applications that are configured to receive incoming instant messages from senders and forward outgoing instant messages to recipients via a computer network, such as the Internet. Examples of such applications include Skype®, WhatsApp®, WeChat®, Google Hangouts®, Snapchat®, and Instagram Direct®. In some embodiments, the IM applications can facilitate transmission of text messages. In other embodiments, the IM applications can also facilitate application sharing (e.g., desktop presentations), file transfers, clickable hyperlinks, Voice over IP (VoIP) calls, video chats, or other suitable communication functions for users.

Also used herein, the term "instant message" generally refers to an electronic message delivered between two or more users via immediate or real-time text transmission. In certain implementations, an instant message can be transmitted when a user compose a text message and then click on a "Send" button or simply press the return key on a computer keyboard. In other implementations, text of an instant message can be transmitted to a recipient when a user is composing the instant message. In further implementations, instant messages can be time stamped, stored on an IM server, stored on a client device, or otherwise suitably processed.

Also used herein, an "IM event" generally refers to an occurrence of an IM operation during an IM session between two or more users. In one example, when a first user composes an initial instant message and transmits the composed instant message to a second user, transmission of the instant message by the first user is a first example IM event while receiving the instant message by the second user is a second example IM event. Other example IM events can also include application sharing via IM, an audio/video conversation start, accept, and stop, receiving a user comment such as like, etc.

Further used herein, the term "active IM session" generally refers to an IM session between two or more users during which multiple instant messages are transmitted in rapid succession (e.g., with a response delay less than half a minute, one minute, or other suitable thresholds). A response delay is a time elapsed between receiving an Instant message and responding to the received Instant message by a user during an IM session. The individual response delays can then be summed to represent a total response delay for the active IM session. Without being bound by theory, it is believed that the total response delay can accurately represent IM usage in time during the active IM sessions because such delays can each represent a period a user spend reading an incoming Instant message and composing a response to a received incoming Instant message.

A difficulty in limiting IM usage is that accurately measuring IM usage of users due to a vast variety of communication patterns during IM sessions. For example, in one scenario, users engage in an IM conversation by sending and responding Instant messages in active IM session. However, in other scenarios, a first user may send multiple Instant messages to a second user. The second user, however, does not respond or even read the received Instant messages from the first user. In further scenarios, after an elapsed time, the second user may then respond with multiple Instant messages of his/her own, at which time the initiating user may be busy, offline, or otherwise unable to read or respond to any Instant messages. In such complex scenarios, measuring IM usage for the users may be difficult because a large portion of delays between receptions and responses of Instant messages may not involve IM usage at all.

Several embodiments of the disclosed technology are directed to allowing users to control IM usage by sufficiently accurately measuring IM usage as a function of numbers of IM events during IM sessions. It has been recognized that measuring numbers of the foraging example IM events can be generally accurate by using, for instance, a counter. Based on the measured numbers of IM events, IM usage in terms of time can be sufficiently accurately estimated or derived based on a correlation between time spent in IM sessions and corresponding numbers of IM events. Once sufficiently accurate IM usage is obtained, the IM server can be configured to automatically adjust certain functionalities of the provided IM service such that distractions to users during and/or after working hours can be reduced. As such, the IM server can provide IM services to users to facilitate efficient communications and collaboration among the users while help to reduce distractions and worsen work-life balance of the users, as described in more detail below with reference to FIGS. 1-5.

FIG. 1 is a schematic diagram illustrating an instant message system 100 implementing automatic IM usage control in accordance with embodiments of the disclosed technology. As shown in FIG. 1, the instant message system 100 can include a computer network 104 interconnecting client devices 102 and one or more instant message servers 106 (referred to as "instant message server 106" here in for simplicity). The instant message server 106 is also interconnected with a network storage 112 containing one or more records of IM session data 119 and a database 108 containing one or more records of weights 110 for each type of IM events.

The computer network 104 can include an intranet, a wide area network, the Internet, or other suitable types of network. Even though particular components of the instant message system 100 are shown in FIG. 1, in other embodiments, the instant message system 100 can also include additional and/or different components or arrangements. For example, in certain embodiments, the instant message system 100 can also include additional network storage devices, additional servers, and/or other suitable components (not shown). In other embodiments, the network storage 112 and/or the database 108 may be integrated into the instant message server 106.

The client devices 102 can each include a computing device that facilitates corresponding users 101 (shown as first and second users 101a and 101b) to access instant message and other suitable types of computing services provided by the instant message server 106 via the computer network 104. In the illustrated embodiment, the client devices 102 individually include a desktop computer. In other embodiments, the client devices 102 can also include laptop computers, tablet computers, smartphones, or other suitable computing devices. Even though the first and second users 101a and 101b are shown in FIG. 1 for illustration purposes, in other embodiments, the instant message system 100 can facilitate any suitable number of users 101 to access suitable types of computing services provided by the instant message server 106.

The instant message server 106 can be configured to facilitate IM reception, storage, forwarding, and other related functionalities. For example, as shown in FIG. 1, the first user 101a can utilize the client device 102 to generate and transmit instant messages 116 to the second user 101b via the instant message server 106 and vice versa. The instant messages 116 can then be outputted to the first and second users 101a and 101b via a user interface 114. In FIG. 1, received instant messages are shown as having regular contrast while transmitted instant messages are shown as having reverse contrast. For instance, as shown in FIG. 1, the first user 101a can initiate an IM session with the second user 101b by transmitting "Hi John" to the second user 101b. The second user 101b can then respond with "Morning" before the first user 101a requests the second user 101b to call the first user 101a by transmitting "Can you call me?". The second user 101b can then respond with "Ok, call you in ten." The IM session can then be terminated by, for instance, closing the user interface 114 or via other suitable means.

As shown in FIG. 1, the instant message server 106 can be configured to facilitate the foregoing IM transmission by receiving and forwarding the instant messages 116 to/from the client devices 102 associated with the first and second users 101a and 101b. The instant message server 106 can also be configured to collect IM session data 119 and store the collected IM session data 119 in the network storage 112. Example IM session data 119 can include a session ID (e.g., a globally unique identification number), instant messages received/transmitted with time stamps, session start time, session end time, etc.

In accordance with embodiments of the disclosed technology, the instant message server 106 can also include an IM usage engine 130 (shown in FIG. 2A) that is configured to correlate IM usage of the first and second users 101a and 101b with a number of IM events during the IM session to derive weights 110 for various types of IM events. The IM usage engine 130 can then be configured to utilize the derived weights 110 to sufficiently accurately determine IM usage in terms of seconds, minutes, hours, or other suitable units of time for additional IM sessions between the first and second users 101a and 101b and/or among other users 101 (not shown). Once sufficiently accurate IM usage is obtained, the IM usage engine 130 can be configured to automatically adjust certain functionalities of the provided IM service by the instant message server 106 such that distractions to the users 101 during and/or after working hours can be reduced. As such, IM services provided to the users 100 can facilitate efficient communications and collaboration among the users 101 while help to reduce distractions and worsen work-life balance of the users 101, as described in more detail below with reference to FIGS. 2A-2C.

Figure 2A:
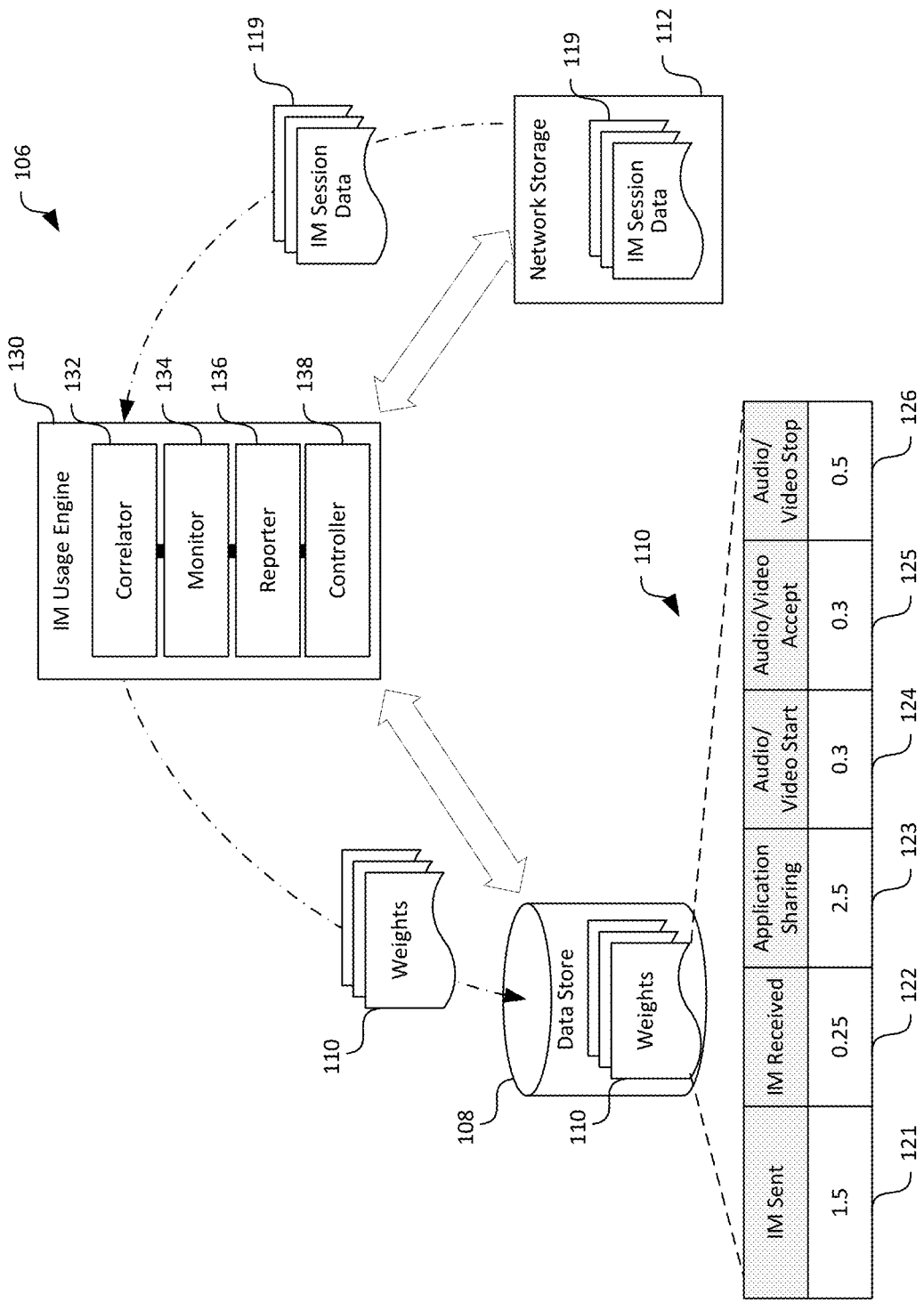
FIGS. 2A-2C are schematic diagrams illustrating certain hardware/software components of the instant message system of FIG. 1 during various stages of automatic IM usage control in accordance with embodiments of the disclosed technology.
Figure 2B:
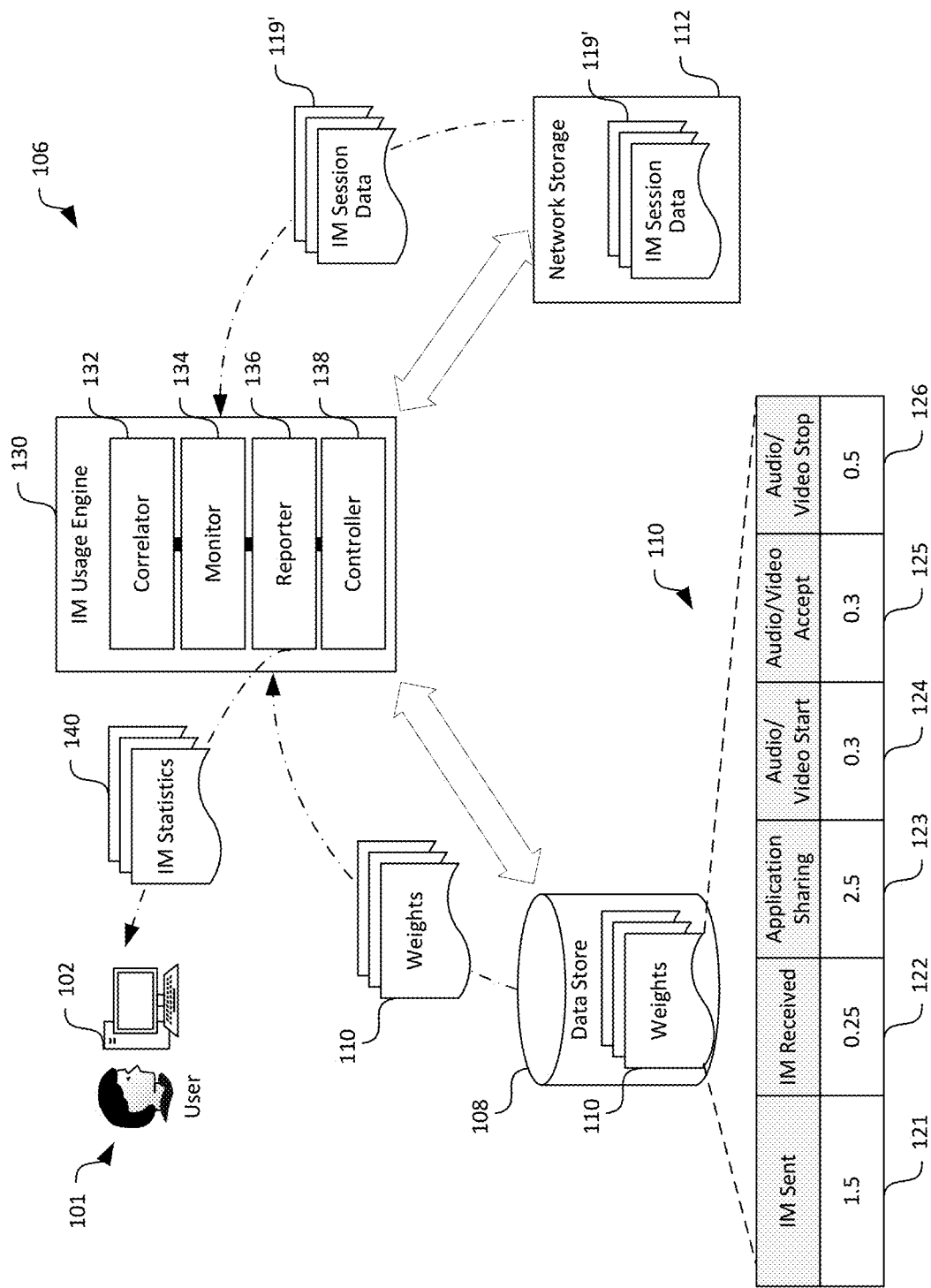
Figure 2C:
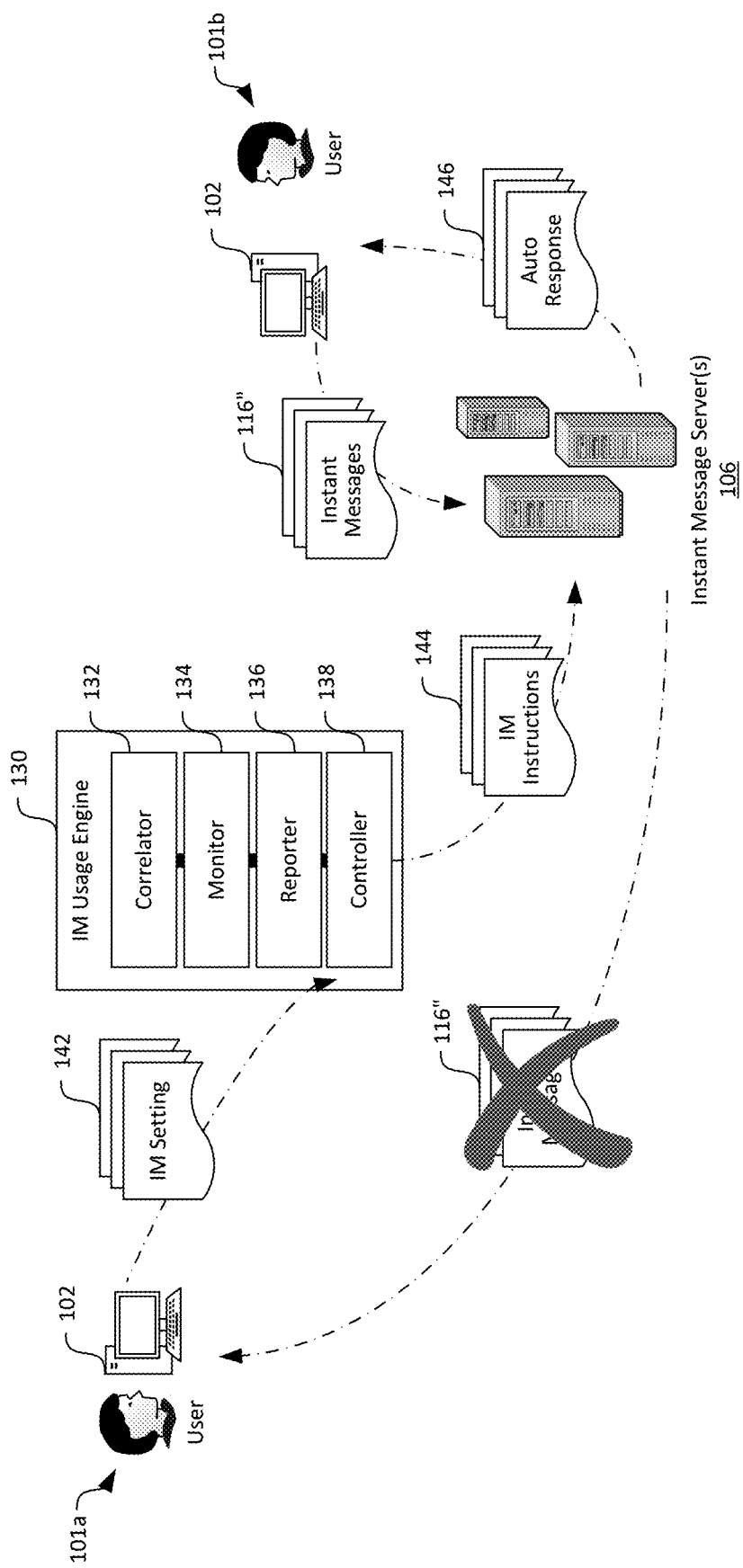

FIGS. 2A-2C are schematic diagrams illustrating certain hardware/software components of the instant message system 100 during various stages of automatic IM usage control in accordance with embodiments of the disclosed technology. In FIGS. 2A-2C, only certain components of the instant message system 100 of FIG. 1 are shown for clarity. In FIG. 2A and in other Figures herein, individual software components, objects, classes, modules, and routines may be a computer program, procedure, or process written as source code in C, C++, C #, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the IM usage engine 130 can include a correlator 132, a monitor 134, a reporter 136, and a controller 138 operatively coupled to one another. Even though the foregoing components of the IM usage engine 130 are shown for illustration purposes, in other embodiments, the IM usage engine 130 can also include interface components, network components, or other suitable types of components in addition to or in lieu of those shown in FIG. 2A. In further embodiments, at least one of the components of the IM usage engine 130 may be independent of other components shown in FIG. 2A. For example, in certain implementations, the correlator 132 may be hosted on an offline server (not shown) while the monitor 134, the reporter 136, and the controller 138 can be hosted on the instant message server 106. In further embodiments, the foregoing components and other suitable components of the IM usage engine 130 can have other suitable configurations and/or arrangements.

The correlator 132 can be configured to access historical IM session data 119 representing response delays to instant messages 116 in multiple active IM sessions. The response delays can each be represented by a time elapsed between receiving an instant message and responding to the received instant message by a user 101 during an active IM session. For instance, in the illustrated example in FIG. 1, a first response delay can include a time (e.g., 1.5 seconds) between arrival of the instant message "Hi John" at the client device 102 of the second user 101b and transmission of the instant message "Morning" from the second user 101b to the first user 101a. A second response delay can include another time (e.g., 2 seconds) between arrival of the instant message "Morning" at the client device 102 of the first user 101b and transmission of the instant message "Can you call me?" from the first user 101a to the second user 101b. A third response delay can include a further time (e.g., 2.5 seconds) between arrival of the instant message "Can you call me?" at the client device 102 of the second user 101b and transmission of the instant message "Ok, call you in ten" from the second user 101a to the first user 101b.

The individual response delays described above can then be summed to represent a total response delay for the active IM session between the first and second users 101a and 101b. The total response delay as well as numbers of instant messages 116 sent and received by each of the first and second users 101a and 101b can then be stored as records of the IM session data 119. Without being bound by theory, it is believed that the total response delay can generally accurately represent a period of IM usage during active IM sessions because such delays can each represent a period a user 101 spend reading an incoming instant message 116 (e.g., "Hi, John") and composing a response to a received incoming instant message (e.g., "Morning").

Refer back to FIG. 2A, based on the accessed IM session data 119 of response delays and the numbers of instant messages sent/received, the correlator 132 can be configured to determine respective weights for each type of IM events detected during the active IM session such that a combination of the weighted numbers of IM events sufficiently accurately match (e.g., within 95%) total response delay for each user 101 measured during the active IM session, as follows:

$$\text{Usage(time)} = w_1 A_1 + w_2 A_2 + w_3 A_3 + \ldots + w_n A_n \quad (1)$$

where Usage is measured in time; $w_1, w_2, w_3, \ldots w_n$, are weights for respective numbers of IM events $A_1, A_2, A_3, \ldots, A_n$. Examples of the weights can include integers, floating point numbers, or other suitable types of numbers. In the illustrated example above, a total delay for the second user 101b is 3.5 seconds (i.e., the combination of the first and second response delays) for two instant messages 116 received and transmitted. Thus, for the second user 101b, a first example weight for a first IM event of instant message received can be 0.25 while a second example weight for a second IM event of instant message sent can be 1.5. Thus, IM usage for the example IM session can be calculated as follows:

$$\text{Usage(seconds)} = 1.5 \times 2 + 0.25 \times 2 = 3.5 \text{ seconds}$$

Various techniques can be implemented in the correlator 132 to determine the weights. In one implementation, the correlator 132 can be configured to determine the weights via iteration. For instance, preset initial values of the weights can be used to calculate a IM usage time, as shown in Equation (1) above. The calculated IM usage time can then be compared to the sum of the measured response delays (e.g., 3.5 seconds for the second user 101b). If the difference is greater than a convergence threshold (e.g., 5%), the weights can be adjusted according to, for example, the difference between the calculated usage time and the sum of the measured response delays. The foregoing iteration operations can then be repeated until convergence, i.e., the difference between the measured usage time and calculated usage time is within a threshold of each other, e.g., within 95%, 99%, or other suitable values. In other implementations, the correlator 132 can also be configured to determine the weights directly by, for instance, dividing the sum of the measured response delays by the number of detected IM events or using other suitable techniques.

In certain implementations, the weights 110 can be specific to a user 101. For instance, each of the first and second users 101a and 101b can have a corresponding record of weights 110 in the data store 108. The corresponding records can contain weights 110 that differ from one another. In other implementations, the weights 110 can be determined based on an response delays for all users 101. Thus, a single set of weights 110 may be applicable to all of the users 101. In further implementations, the users 101 may be subdivided into groups, departments, roles, etc., such that each group, depart, role may have corresponding weights 110.

In the illustrated example in FIG. 2A, the weights 110 can be stored as entries in a table. For instance, the table can include an IM sent filed 121, an IM received field 122, an application sharing field 123, an audio/video start field 124, an audio/video accept field 125, and an audio/video stop field 126. Each of the foregoing field can be configured to store a weight (e.g., a number) corresponding to each type of the IM events. For example, the IM sent field 121 can store a value of 1.5 corresponding to an IM event of sending an instant message. The IM received field 122 can store a value of 0.25 corresponding to another IM event of receiving an instant message. In other examples, the record of the weights 110 can also include a user identification field configured to store a user identification value of the user 101, last updated field configured to store a date/time at which the weights were last updated, or other suitable types of data fields.

As shown in FIG. 2B, the monitor 134 of the IM usage engine 130 can be configured to determine IM usage of the users 101 (e.g., the second user 101b) by monitoring numbers of different types of IM events in additional IM sessions and deriving IM usage according to Equation (1) above by using the weights provided by the correlator 132 for various IM communication patterns. For instance, as shown in FIG. 2B, additional IM session data 119' of the second user 101b can be accessed by the monitor 134. The additional IM session data 119' contains numbers of text messages are sent and received in additional IM sessions the second user engaged in. Based on the retrieved additional IM session data 119', the monitor 134 can be configured to determine an IM usage time for the second user 101b as follows:

$$\text{Usage(seconds)} = 1.5 \times (A_1) + 0.25 \times (A_2)$$

where $A_1$ is a number of Instant messages 116 sent and $A_2$ is a number of Instant messages 116 received. As shown above, IM usage as measured in seconds can be sufficiently accurately derived based on $A_1$ and $A_2$ with corresponding weights, i.e., 1.5 and 0.25, respectively. Thus, in an example additional IM session, if $A_1$ equals twenty and $A_2$ equals twenty one, then the IM usage is equal to $1.5 \times 20 + 0.25 \times 21 = 40.25$ seconds Also shown in FIG. 2B, the reporter 136 can be configured to output the derived IM usage to the users 101 periodically (e.g., daily, weekly, etc.) or in other suitable basis. In certain implementations, the reporter 136 can also be configured to output statistics 140 or metrics of the derived IM usage during and/or after working hours based on, for example, historical data, IM usage of other users, average IM usage in the organization, etc. For example, the reporter 136 can be configured to indicate an anomalous pattern to the user 101 that the user's IM usage during and/or after working hours is abnormal when a weekly IM usage of the user 101 spiked when compared to historical values. In another example, the reporter 136 can also be configured to indicate that the user's IM usage significantly deviates from an average IM usage in an organization and/or a role of the user 101 in the organization. In a further example, the reporter 136 can also be configured to indicate that the user's productivity may be negatively impacted when any of the foregoing or other suitable types of occurrences are detected. In yet further examples, the reporter 136 can be configured to transmit celebratory messages (e.g., "Congratulation! You have met your goal.") to at pre-defined intervals (e.g., weekly, bi-weekly, or monthly) when the derived IM usage of the user 101 is below a desired threshold.

Based on the reported IM statistics 140 and/or the IM usage, the user 101 can then control or adjust IM settings 142 for accessing the IM service provided by the instant message server 106, as shown in FIG. 2C. In the illustrated embodiment, the user 101 can submit to the IM setting 142 as user input to the controller 138. The IM setting 142 can include indications such as muting IM notifications during certain date/time (e.g., after hours), automatically setting an online status of the user 101, blocking instant messages from certain other users 101, or other suitable settings. For example, as shown in FIG. 2C, the instant message server 106 can automatically block IM notifications and/or delivery instant messages 116" to the first user 101a from the second user 101b for certain date/time periods.

In other embodiments, the controller 138 can automatically adjust the IM settings 142 for the users 101 based on the derived IM usage of the individual users 101 and corresponding thresholds. For example, when a user's IM usage exceeds a usage threshold, IM service provided to the user 101 may be disabled. Based on the IM settings 142, the controller 138 can then issue IM instructions 144 to the instant message server 106 for altering operations of the IM service provided to the users 101. For instance, the controller 138 can be configured to instruct the instant message server 106 to automatically show a user's online IM status as "Do Not Disturb," "Busy," "Off Work," or other suitable status during certain date/time periods or based on other suitable criteria irrespective to a current online IM status of the user, as described in more detail below with reference to FIGS. 3A and 3B.

Figure 3A:
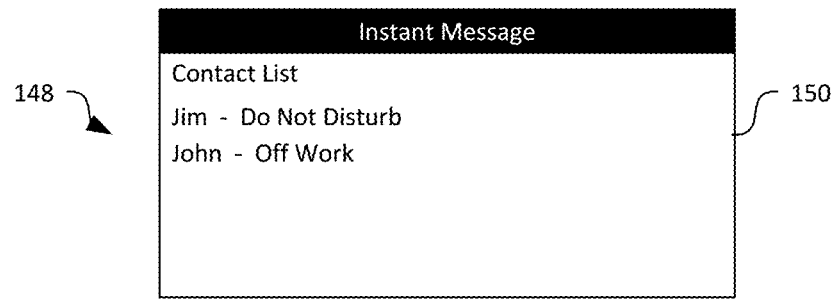
FIGS. 3A-3D are schematic diagrams illustrating example user interfaces configured to utilize automatic IM usage control in accordance with embodiments of the disclosed technology.
Figure 3B:
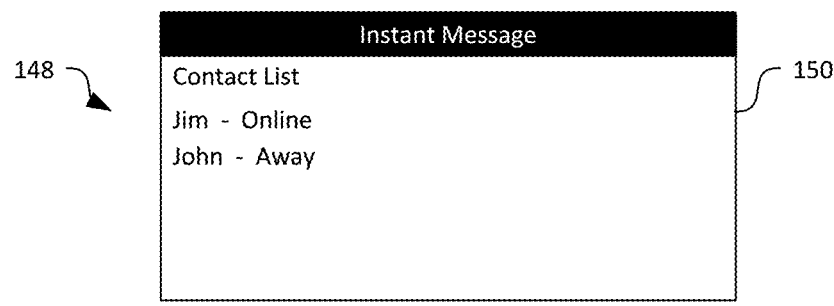
Figure 3C:
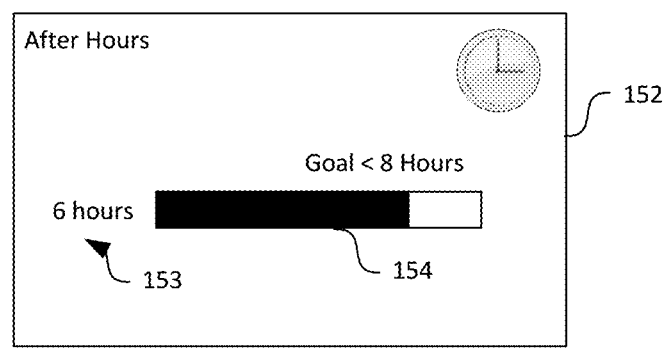

FIGS. 3A-3C are schematic diagrams illustrating example user interfaces configured to automatically adjust an online IM status of a user 101 (FIG. 1). As shown in FIG. 3A, during certain date/time, the instant message server 106 (FIG. 1) can automatically set a user's online IM status such that no IM notifications and/or instant messages associated with the IM notifications are surfaced. For example, as shown in FIG. 3A, the online IM status for "Jim" is set to "Do Not Disturb" while that for "John" is set to "Off Work." As shown in FIG. 3B, once the date/time expires, the instant message server 106 can then automatically set the online IM status of the users 101 to other suitable values. For instance, the online IM status of "Jim" is now shown as "Online" while that of "John" is shown as "Away."

Figure 3D:
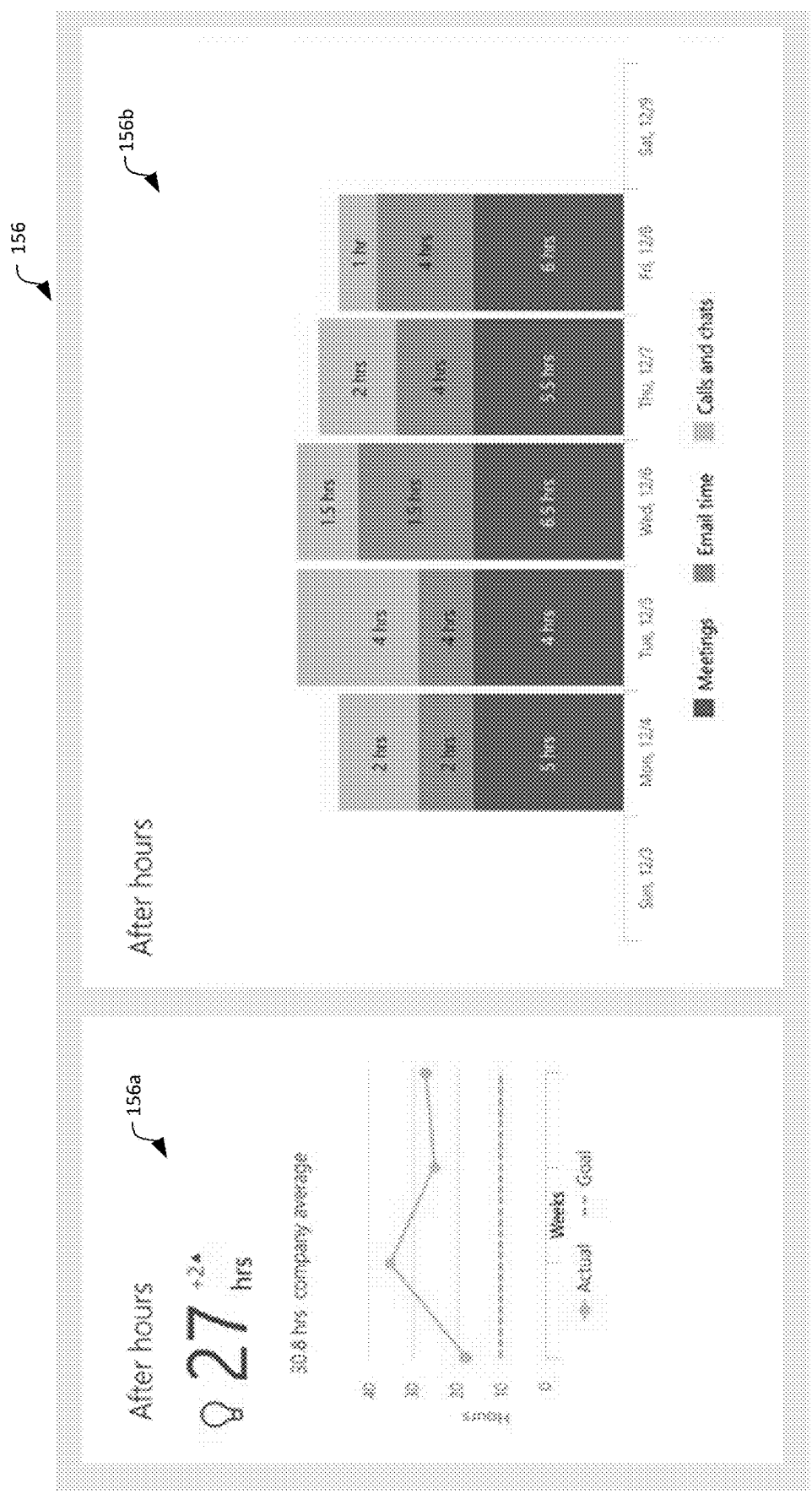

FIGS. 3C and 3D illustrate additional example user interfaces 152 and 156, respectively, for outputting the derived IM usage after working hours over a period of time (e.g., weekly). As shown in FIG. 3C, the user interface 152 can include an output field 153 configured to output an accumulated IM usage over the period and a bar graph showing relatively to a goal for IM usage after hours. In other examples, the user interface 152 can also include control elements (e.g., hyperlinks for modifying the goal) and/or other suitable interface elements. As shown in FIG. 3D, the example user interface 156 can include a first portion 156a shown trends and comparisons of IM usage after working hours of a user. The user interface 156 can also include a second portion 156b containing a bar graph illustrating a breakdown of after hour activities of the user.

Figure 4A:
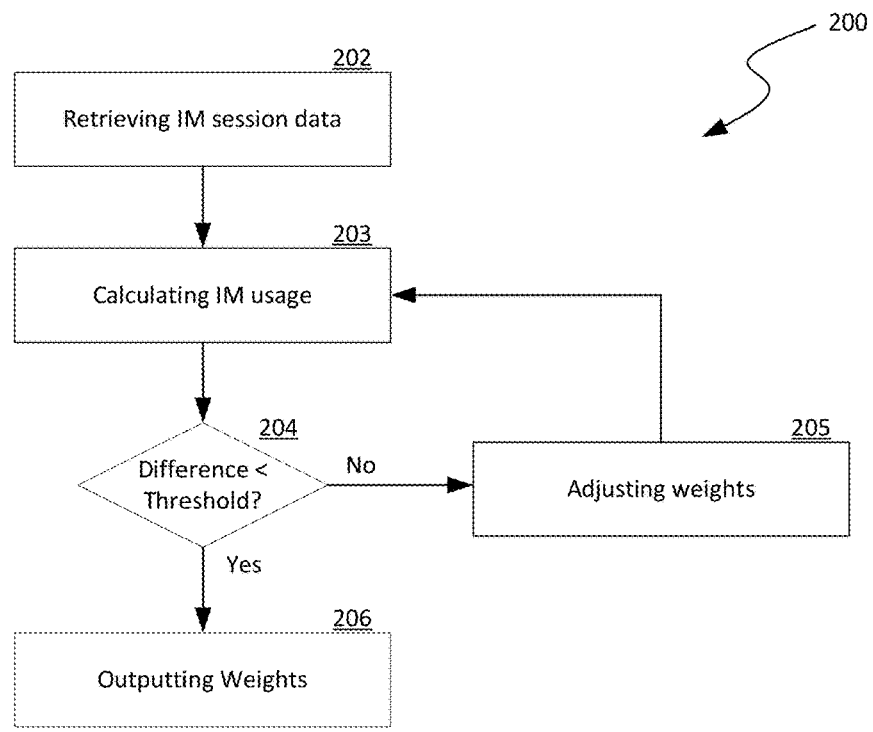
FIGS. 4A and 4B are flowcharts illustrating processes of automatic IM usage control in accordance with embodiments of the disclosed technology.
Figure 4B:
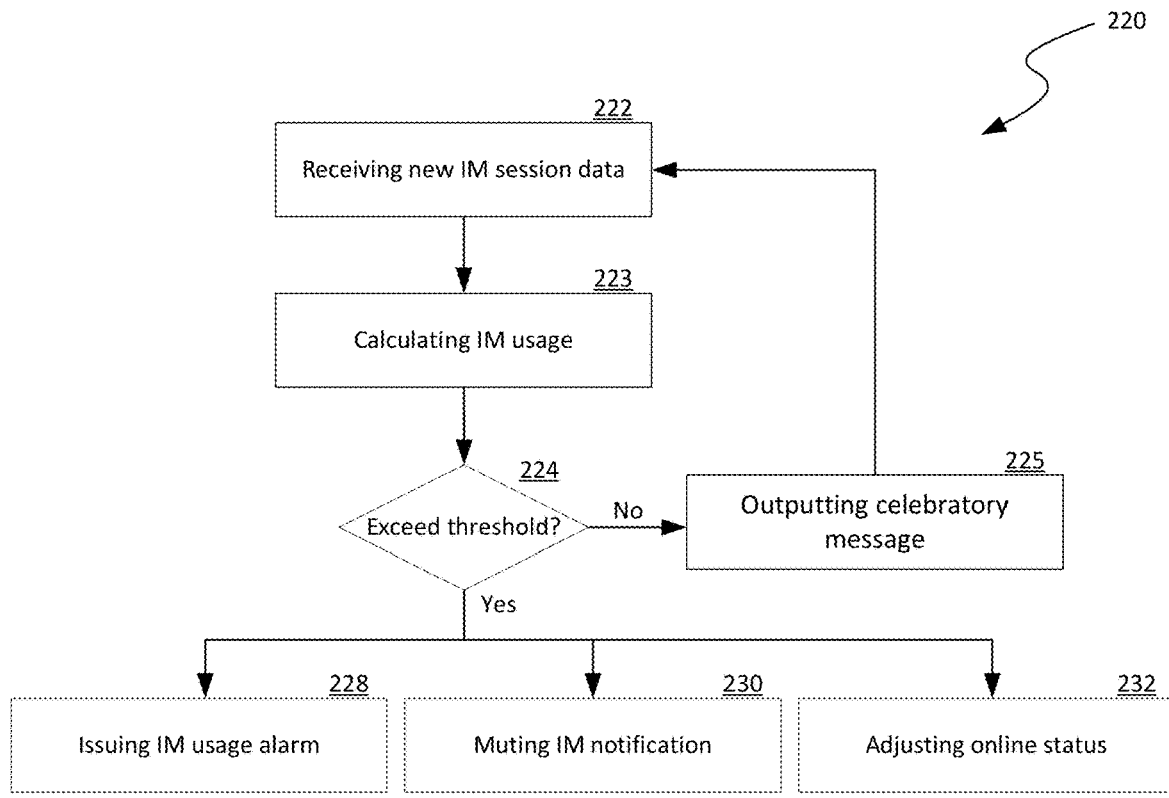

FIGS. 4A and 4B are flowcharts illustrating a process 200 of automatic IM usage control in accordance with embodiments of the disclosed technology. Even though embodiments of the process 200 are described below with reference to the instant message system 100 of FIGS. 1-2C, in other embodiments, the process 200 may be implemented in other computing systems with different components and/or arrangements.

As shown in FIG. 4A, the process 200 can include retrieving IM session data at stage 202. The IM session data can include numbers of various types of IM events as well as response delays during IM sessions. The process 200 can then include calculating an IM usage time using weights for each type of IM events and the corresponding number of IM events at stage 203. The process 200 can then include a decision stage 204 to determine whether a difference between the calculate IM usage time and a total response delay is less than a convergence threshold. In response to determining that the difference between the calculate IM usage time and the total response delay is less than the convergence threshold, the process 200 can include outputting values of the weights at stage 206. Otherwise, the process 200 can include adjusting the weights for the various types of IM events at stage 205 before reverting to calculating another IM usage time at stage 203 with the adjusted weights.

As shown in FIG. 4B, another process 220 can include receiving new or additional IM session data at stage 222. Based on the received IM session data, the process 220 can include calculating an IM usage time at stage 223 based on numbers of different types of IM events included in the received IM session data and the weights predetermined as described above with reference to FIG. 4A. The process 220 can then include a decision stage 224 to determine whether the calculated IM usage time exceeds a threshold. In response to determining that the calculated IM usage time exceeds the threshold, the process 220 can include performing one or more of issuing an IM usage alarm at stage 228, muting IM notification at stage 230, or adjusting an online IM status of a user at stage 232. In response to determining that the calculated IM usage time does not exceed the threshold, the process 220 can include outputting a celebratory message to the user before the process 220 reverts to receiving additional IM session data at stage 222.

Figure 5:
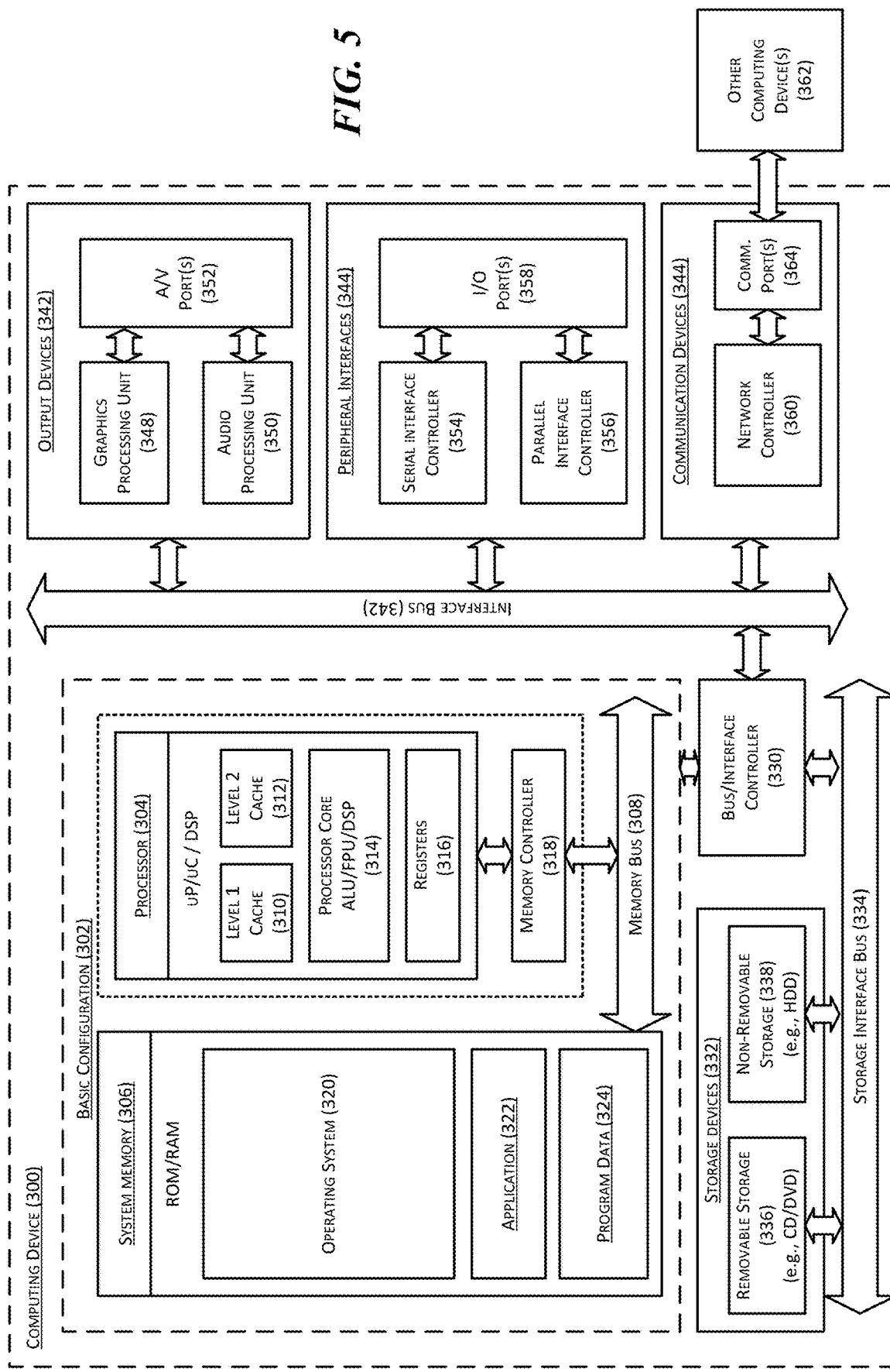
FIG. 5 is a computing device suitable for certain components of the instant message system in FIG. 1.

FIG. 5 is a computing device 300 suitable for certain components of the distributed instant message system 100 in FIG. 1. For example, the computing device 300 can be suitable for the instant message server 106 or the client devices 102 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (μP), a microcontroller (μC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 6 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method for automatic instant message (IM) usage control in an instant message system having one or more instant message servers interconnected by a computer network and configured to provide an IM service to users, the method comprising:

detecting, at an instant message server, occurrences of IM events during one or more IM sessions participated by a user of the IM service and facilitated by the instant message server, the IM events including one or more of IM reception, IM transmission, application sharing, audio/video conversation starts, audio/video conversation accepts, an audio/video conversation stops, or receptions of a user comment;

deriving, at the instant message server, an IM usage time of the user during the one or more IM sessions according to the following:

Usage(time)=$w_1A_1+w_2A_2+w_3A_3+\ldots+w_nA_n$ where Usage is measured in time; $w_1, w_2, w_3, \ldots w_n$, are weights for respective numbers or occurrences of the IM events $A_1, A_2, A_3, \ldots, A_n$;

determining, at the instant message server, whether the determined IM usage time of the user exceeds a preset threshold; and in response to determining that the IM usage time of the user exceeds the threshold, at the instant message server, performing one or more of:

muting notifications of additional incoming instant messages to the user;

notifying the user that the preset threshold for IM use is exceeded;

disabling the IM service provided to the user by the instant message server; or automatically setting an online IM status of the user as offline irrespective to a current online IM status of the user.

2. The method of claim 1 wherein:

detecting the numbers of the IM events includes detecting a first number of reception of the instant messages and a second number of transmission of additional instant messages during the one or more IM sessions participated by the user of the IM service; and deriving the IM usage time includes:

multiplying the first number by a first weight factor corresponding to the reception of the instant messages to derive a first value;

multiplying the second number by a second weight factor corresponding to the transmission of the instant messages to derive a second value; and summing the first and second values to derive the IM usage time.

3. The method of claim 1 wherein:

determining whether the determined IM usage time of the user exceeds the preset threshold includes determining whether the determined IM usage time of the user exceeds a preset threshold for IM use during working hours; and in response to determining that the IM usage time of the user exceeds the preset threshold for IM use during working hours, at the instant message server, performing one or more of:

muting notifications of additional incoming instant messages to the user;

notifying the user that the preset threshold for IM use during working hours is exceeded; or disabling the IM service provided to the user by the instant message server.

4. The method of claim 1 wherein:

determining whether the determined IM usage time of the user exceeds the preset threshold includes determining whether the determined IM usage time of the user exceeds a preset threshold for IM use after working hours; and in response to determining that the IM usage time of the user exceeds the preset threshold for IM use after working hours, at the instant message server, performing one or more of:

notifying the user that the preset threshold for IM use after working hours is exceeded;

automatically setting an online IM status of the user as offline; or muting notifications of additional incoming instant messages to the user from one or more other users during periods after working hours.

5. The method of claim 1 wherein deriving the IM usage time includes converting the individual numbers of the detected occurrences of the IM events from a count to a period of time using the corresponding weight factors based on a correlation between time spent in the one or more IM sessions and corresponding numbers of IM events.

6. An instant message (IM) server in an instant message system configured to provide an IM service to users, the instant message server comprising:
   a processor; and
   a memory operatively coupled to the processor, the memory containing instructions executable by the processor to cause the instant message server to:
      upon detecting occurrences of IM events during one or more IM sessions participated by a user of the IM service,
         determine an IM usage time of the user during the one or more IM sessions based on numbers of the detected occurrences of the IM events and weight factors corresponding to each type of the IM events, the weight factors correlating the numbers of occurrences of each type of the IM events to a corresponding IM usage period for each occurrence;
      perform a comparison of the determined IM usage time of the user with a preset threshold; and
      when the IM usage time of the user exceeds the threshold based on the comparison, automatically adjust the IM service provided to the user by the instant message server.

7. The instant message server of claim 6 wherein to automatically adjust the IM service includes to perform one or more of:
   muting notifications of additional incoming instant messages to the user;
   notifying the user that the preset threshold for IM use is exceeded;
   disabling the IM service provided to the user by the instant message server; or
   automatically setting an online IM status of the user as offline irrespective to a current online IM status of the user.

8. The instant message server of claim 6 wherein:
   the numbers of the IM events includes a first number of reception of the instant messages and a second number of transmission of additional instant messages during the one or more IM sessions; and
   to determine the IM usage time includes to:
      multiply the first number by a first weight factor corresponding to the reception of the instant messages to derive a first value;
      multiply the second number by a second weight factor corresponding to the transmission of the instant messages to derive a second value; and
      sum the first and second values to derive the IM usage time.

9. The instant message server of claim 6 wherein:
   the types of the IM events includes IM reception, IM transmission, application sharing, an audio/video conversation start, an audio/video conversation accept, an audio/video conversation stop, or reception of a user comment; and
   to determine the IM usage time includes to:
      multiply individual numbers of occurrences of the IM reception, IM transmission, application sharing, an audio/video conversation start, an audio/video conversation accept, an audio/video conversation stop, or reception of the user comment with a corresponding weight factor; and
      sum results of multiplying the individual numbers of occurrences with the corresponding weight factors.

10. The instant message server of claim 6 wherein:
   to perform the comparison includes to perform a comparison of the determined IM usage time of the user with a preset threshold for IM use during working hours; and
   when the determined IM usage time of the user exceeds the preset threshold for IM use during working hours, at the instant message server, performing one or more of:
      muting notifications of additional incoming instant messages to the user;
      notifying the user that the preset threshold for IM use during working hours is exceeded; or
      disabling the IM service provided to the user by the instant message server.

11. The method of claim 6 wherein:
   to perform the comparison includes to perform a comparison of the determined IM usage time of the user with a preset threshold for IM use after working hours; and
   in response to determining that the IM usage time of the user exceeds the preset threshold for IM use after working hours, to perform one or more of:
      notifying the user that the preset threshold for IM use after working hours is exceeded;
      automatically setting an online IM status of the user as offline; or
      muting notifications of additional incoming instant messages to the user from one or more other users during periods after working hours.

12. A method for automatic instant message (IM) usage control in an instant message system having one or more instant message servers interconnected by a computer network and configured to provide an IM service to users, the method comprising:
   detecting, at an instant message server, occurrences of types of IM events during one or more IM sessions participated by a user of the IM service and facilitated by the instant message server, the types of the IM events including at least IM reception and IM transmission;
   deriving, at the instant message server, an IM usage time of the user during the one or more IM sessions based on numbers of the detected occurrences of the IM events and weight factors corresponding to each type of the IM events;
   determining, at the instant message server, whether the determined IM usage time of the user exceeds a preset threshold; and
   in response to determining that the IM usage time of the user exceeds the threshold, at the instant message server, automatically adjusting the IM service provided to the user by the instant message server.

13. The method of claim 12 wherein deriving the IM usage time includes calculating the IM usage time according to the following:

$$\text{Usage(time)} = w_1 A_1 + w_2 A_2 + w_3 A_3 + \ldots + w_n A_n$$

where Usage is measured in time; $w_1, w_2, w_3, \ldots w_n$, are weights for respective numbers or occurrences of IM events $A_1, A_2, A_3, \ldots, A_n$.

14. The method of claim 12 wherein automatically adjusting the IM service includes one or more of:
   muting notifications of additional incoming instant messages to the user;
   notifying the user that the preset threshold for IM use is exceeded;

disabling the IM service provided to the user by the instant message server; or automatically setting an online IM status of the user as offline irrespective to a current online IM status of the user.

15. The method of claim 12 wherein:

detecting the numbers of types of IM events includes detecting a first number of reception of the instant messages and a second number of transmission of additional instant messages during the one or more IM sessions participated by the user of the IM service; and deriving the IM usage time includes:
    multiplying the first number by a first weight factor corresponding to the reception of the instant messages to derive a first value;
    multiplying the second number by a second weight factor corresponding to the transmission of the instant messages to derive a second value; and
    summing the first and second values to derive the IM usage time.

16. The method of claim 12 wherein:

the types of the IM events also includes application sharing, an audio/video conversation start, an audio/video conversation accept, an audio/video conversation stop, or reception of a user comment; and deriving the IM usage time includes deriving the IM usage time based on numbers of the detected occurrences of IM reception, IM transmission, application sharing, audio/video conversation starts, audio/video conversation accepts, an audio/video conversation stops, or receptions of a user comment.

17. The method of claim 12 wherein deriving the IM usage time includes converting the individual numbers of the detected occurrences of the IM events from a count to a period of time using the corresponding weight factors based on a correlation between time spent in the one or more IM sessions and corresponding numbers of IM events.

18. The method of claim 12 wherein:

determining whether the determined IM usage time of the user exceeds the preset threshold includes determining whether the determined IM usage time of the user exceeds a preset threshold for IM use during working hours; and in response to determining that the IM usage time of the user exceeds the preset threshold for IM use during working hours, at the instant message server, performing one or more of:
    muting notifications of additional incoming instant messages to the user;
    notifying the user that the preset threshold for IM use during working hours is exceeded; or
    disabling the IM service provided to the user by the instant message server.

19. The method of claim 12 wherein:

determining whether the determined IM usage time of the user exceeds the preset threshold includes determining whether the determined IM usage time of the user exceeds a preset threshold for IM use after working hours; and in response to determining that the IM usage time of the user exceeds the preset threshold for IM use after working hours, at the instant message server, performing one or more of:
    notifying the user that the preset threshold for IM use after working hours is exceeded;
    automatically setting an online IM status of the user as offline; or
    muting notifications of additional incoming instant messages to the user from one or more other users during periods after working hours.

20. The method of claim 12, further comprising:

retrieving historical IM session data containing additional numbers of the types of IM events and corresponding response delays; and iteratively determining the weight factors based on the additional numbers of the types of IM events and corresponding response delays in the retrieved historical IM session data; and storing the determined weight factors as database records for access by the instant message server in the instant message system.

* * * * *